(12) United States Patent
Wendel

(10) Patent No.: US 12,716,454 B2
(45) Date of Patent: Aug. 25, 2026

(54) BEARING COMPONENT

(71) Applicant: AKTIEBOLAGET SKF, Gothenburg (SE)

(72) Inventor: Michael Wendel, Bremen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 2 days.

(21) Appl. No.: 18/675,278

(22) Filed: May 28, 2024

(65) Prior Publication Data

US 2024/0401643 A1 Dec. 5, 2024

(30) Foreign Application Priority Data

Jun. 5, 2023 (DE) ......................... 102023205216.4

(51) Int. Cl.
*F16C 33/58* (2006.01)
*B23K 26/352* (2014.01)
*F16C 33/64* (2006.01)

(52) U.S. Cl.
CPC .......... *F16C 33/586* (2013.01); *B23K 26/352* (2015.10); *F16C 33/64* (2013.01); *F16C 2223/10* (2013.01)

(58) Field of Classification Search
CPC ...... F16C 33/585; F16C 33/586; F16C 33/64; F16C 2223/10; F16C 2223/18; F16C 33/583; B23K 26/34; B23K 26/352
See application file for complete search history.

(56) References Cited

U.S. PATENT DOCUMENTS

2020/0040944 A1* 2/2020 Sticht .................... F16C 33/583
2024/0344563 A1* 10/2024 Suganuma ........... B23K 26/342

FOREIGN PATENT DOCUMENTS

JP S5947524 A * 3/1984

OTHER PUBLICATIONS

Machine Translation of JP-S5947524-A (Year: 1984).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing component has a raceway face and a non-functional face different from the raceway face, and at least one first portion of the non-functional face is laser-hardened. Also a method that includes providing a bearing component having a raceway face and a non-functional face different from the raceway face and laser hardening at least one first portion of the non-functional face.

19 Claims, 3 Drawing Sheets

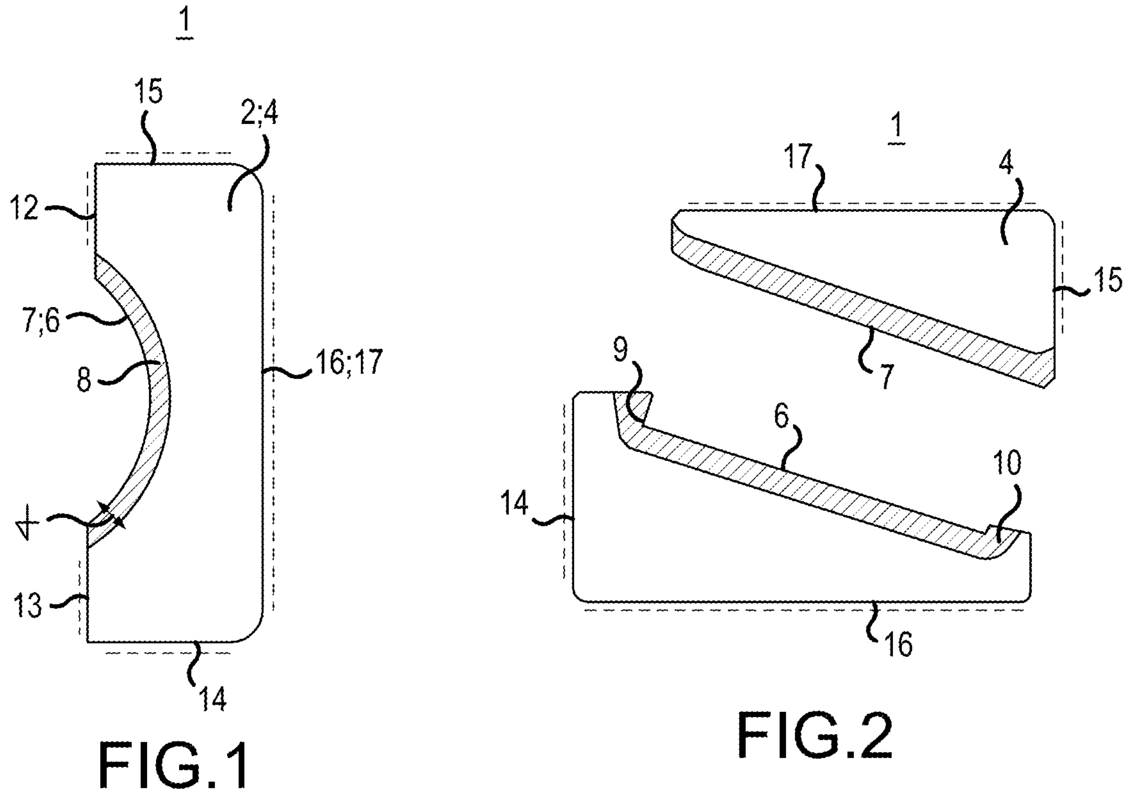
FIG.1
FIG.2
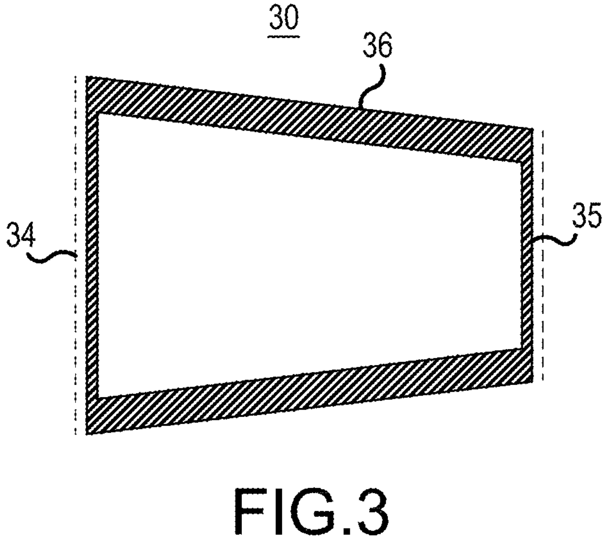
FIG.3

BEARING COMPONENT

CROSS-REFERENCE

This application claims priority to German patent application no. 10 2023 205 216.4 filed on Jun. 5, 2023, the contents of which are fully incorporated herein by reference.

TECHNOLOGICAL FIELD

The present disclosure is directed to a bearing component having a laser-hardened surface region.

BACKGROUND

In order to have particularly good resistance to wear and to resist the high loads to which a bearing component can be subjected, it is known practice to specifically harden bearing components at their functional faces. In the context of this application, functional faces are understood to be the raceways of the bearing components-in other words, faces which are subjected to a high load during operation of the bearing.

The non-functional faces, for example the contact faces in contact with a component accommodating the bearing are usually not hardened in the case of selective hardening, for example in the case of induction hardening, in order to save costs. Thus, in the case of selective hardening, the non-functional faces have the initial hardness of the non-hardened bearing component blank (for example 20-40 HRC).

By contrast, if the non-functional faces are hardened, for example in the case of through-hardening, the hardening can result in relatively significant warping, which then has to be subsequently compensated by hard machining.

SUMMARY

Therefore, it is an aspect of the present disclosure to provide a bearing component which can be manufactured and hardened in an energy-efficient and cost-effective manner and in which it is possible to dispense with laborious reworking.

In the following text, a bearing component having at least one raceway face as a functional face, and at least one further, non-functional face different from the raceway face, is described. As used herein, "raceway face" is intended to mean either a surface of a bearing component that forms a raceway for a rolling element or a surface of a rolling that contacts a raceway surface during normal operation of a bearing. The term "functional face" also includes the surfaces of guide flanges that are contacted by the rolling elements during bearing operation. A "non-functional" face of a bearing component is a surface of the bearing component that is not a raceway face or surface of a guide flange.

In order for the non-functional face also to be sufficiently protected against wear, the disclosure proposes that the at least one non-functional face has a first surface region which is laser-hardened.

The non-functional face may in this case be in particular an inside-diameter face of an inner ring, an outside-diameter face of an outer ring, a lateral face of a bearing ring, a shoulder of a bearing ring, an end face of a rolling element and/or a bore of a rolling element.

In some rolling bearings, flanges which are necessary for holding or guiding the rolling elements may be present, which can be assigned both to the functional faces and to the non-functional faces and can thus be either induction-hardened or laser-hardened.

As a result of the laser-hardening of the non-functional face, it is possible for wear marks on the non-functional face to be avoided during the assembly of the bearing components. Likewise, it is possible, as a result of the laser-hardened non-functional surfaces, for damage on account of wear particles or bearing-component damage to be avoided if creep movements arise between the bearing component and the surrounding component. Furthermore, it is possible as a whole, on account of the laser-hardened surface region, for the wear to be reduced in the event of movements or sliding contact between the bearing components and/or between the bearing component and the element accommodating the bearing component, this increasing the lifetime of the bearing components and of the bearing as a whole.

Furthermore, during laser-hardening, a microstructural phase change occurs, which results in a change in the specific volume or in a change in the density of the physical phases, for example during the transformation into martensite and/or bainite. Thus, the hardened and transformed surface regions have a greater volume than in the initial phase and result in raising of the laser-hardened surface in the micrometre range. As a result, it is again possible for the interference fit and/or friction to be increased in particular at contact faces in contact with surrounding components, for example a shaft or a housing, with the result that the components are subjected to fewer creep movements.

The increase in the coefficient of friction may, however, also make it possible for the interference fit or force fit itself to be reduced, since the high coefficient of friction ensures an equally good form fit between the components. A lower interference fit or a lower contribution of the force fit results in turn in lower tensile stresses in the bearing component (for example inner ring shrink-fitted onto a shaft), this in turn resulting in a longer component lifetime.

Moreover, an increased coefficient of friction between the bearing component and the surroundings (for example housing/shaft) can, on account of the texturing of the surface, contribute to the avoidance of movements (for example ring creep), with the result that the lifetime of the bearing component can be extended.

Furthermore, laser-hardening is a relatively cost-effective hardening process. However, for the raceway, or the functional face, it can be used only to a limited extent, since the hardness penetration depth which can be achieved with laser-hardening is not usually enough to cover the Hertzian stress. For the loads that are to be expected at the non-functional surface, the hardness penetration depth that is achievable with laser-hardening is entirely sufficient, however.

A further advantage of laser-hardening is that, during laser-hardening, only very little if any warping occurs at the bearing component and so expensive reworking, in particular laborious hard machining, can be partially or entirely dispensed with. This also has the advantage that less addition of material is required, since less deformation occurs, this representing better material utilization and likewise saving costs.

Furthermore, the laser-hardening process can be integrated into the reworking procedure (turning, grinding, honing, etc.), wherein integration into existing machines is even possible.

Laser-hardening can be carried out with one or more laser heads.

Furthermore, laser-hardening has further advantages; in particular, laser-hardening has lower energy consumption and lower CO2 emissions. Moreover, laser-hardening exhibits a high energy density and a short process time. It is likewise advantageous that only a small volume is affected, or only a small part of the workpiece cross section is treated, and that no process gases are required. Furthermore, during laser-hardening, the workpiece does not need to be quenched after heating, since quenching takes place by heat conduction in the component. This has the advantage that no quenching medium and thus also no pumps for quenching or cooling of the plant are required. Moreover, the same laser source and optical unit are used for different workpiece geometries and so it is possible to dispense with part-specific tooling.

The laser-hardening of the non-functional faces furthermore makes it possible for a lower alloy steel to be used, this in turn reducing the CO2 emission during steel production.

According to a further preferred exemplary embodiment, the non-functional face is subjected, in the assembled state, to sliding contact with an element accommodating the bearing component and/or is subjected to sliding contact with another bearing component. In the case of sliding contact, a smaller hardness penetration depth usually suffices, since the stress maximum usually forms closer to the surface than in the case of rolling contact. Thus, in the case of sliding contact, hardening by means of a laser suffices, which may reach only a small hardness penetration depth (down to approx. 2 mm), in order to create a sufficiently hard and wear-resistant volume on the corresponding face.

Preferably, the functional faces, in particular the raceway face, are induction-hardened. This can ensure that these faces withstand the high loads in particular in the case of rolling contact. As a result of the combination of induction-hardening and laser-hardening, it is possible for less warping to be introduced into the component than in the case of a comparable through-hardening process, and this can result in less hard machining and thus in cost/energy savings. In this case, the laser-hardening of the non-functional faces can be carried out before or after the induction-hardening process. The laser-hardening can even be carried out within the induction-hardening machine. Alternatively, the laser-hardening can be carried out before the induction-hardening, in particular during soft machining (for example on the lathe, a special machine), or after the induction-hardening (for example on the hard lathe, the grinding machine, eddy current testing or the like, or on a special machine).

According to a further preferred exemplary embodiment, the bearing component is a bearing component of a rolling bearing, in which the raceway face is subjected to rolling contact, for example a bearing ring or a rolling element.

According to a further preferred exemplary embodiment, the non-functional face has at least one second surface region which is not laser-hardened.

As mentioned above, during laser-hardening, a microstructural phase change occurs, which results in a change in the specific volume or in a change in the density of the physical phases, for example during the transformation into martensite and/or bainite. The hardened and transformed regions have a greater volume than in the initial phase and result in raising of the laser-hardened surface in the micrometre range. In conjunction with the unhardened surface regions, this allows a particular surface texture to be applied.

Thus, as a further preferred exemplary embodiment shows, the laser-hardened first surface region may have a first coefficient of friction and the non-laser-hardened second surface region may have a second coefficient of friction, wherein the first coefficient of friction is higher than the second coefficient of friction.

As a result of the targeted increase in the coefficient of friction of the bearing component at particular locations, it may be harder for the bearing component and a counterpart (for example a shaft/housing) to move relative to one another during use. The increase in the coefficient of friction and also the specific configuration of the surface texture may allow a lower interference fit or a lower contribution of the force fit, this in turn resulting in lower tensile stresses in the bearing component and a longer component lifetime.

Alternatively or additionally, the first and the second surface region may be arranged in such a way that the second surface region forms a lubricant reservoir and/or a lubricant channel which is delimited by the first surface region. This advantageously contributes to wear reduction in the case of sliding contacts. Furthermore, this can ensure that lubricant can be retained at particular locations on the bearing component and/or can be guided to particular locations in the bearing component.

According to a further advantageous exemplary embodiment, the first surface region is formed so as to be continuous.

As a result, it is possible for the bearing component to be embodied without a weak point over the entire circumferential face, this ensuring, for example, a uniform increase in the coefficient of friction and thus uniform force transmission. This can be achieved with one or more laser heads.

Alternatively, it may, of course, also be advantageous for the first surface region to be formed as discrete surface region portions.

Thus, it is possible, for example, for a soft, non-laser-hardened region to be provided over the entire circumferential face between the start and end positions of a scanning operation, or even for a plurality of soft regions to be allowed, which form a particular pattern. Thus, it is possible, for example, for the hardening to be in the form of a plurality of rectangles/squares, a plurality of circular/oval locations, a plurality of triangles, or in the form of zigzag shapes, optionally with different angles.

In this case, the patterns may contain further functions, for example the abovementioned lubricant reservoirs or channels. However, they can also be configured just as specific designs which, for example, visually assign the bearing to the applicant as manufacturer by themselves.

An aspect of the disclosure is a bearing component comprising a raceway face, and a non-functional face different from the raceway face, wherein at least one first portion of the non-functional face is laser-hardened. Another aspect of the disclosure is a method that includes providing a bearing component having a raceway face and a non-functional face different from the raceway face and laser hardening at least one first portion of the non-functional face.

A further aspect of the present application relates to a bearing having a bearing component as described above.

Further advantages and advantageous embodiments are specified in the description, the drawings and the claims. In particular, the combinations of features specified in the description and in the drawings are purely by way of example, and so the features can also be present individually or in some other combination.

BRIEF DESCRIPTION OF THE DRAWINGS

In the following text, aspects of the invention will be described in more detail with reference to exemplary embodiments illustrated in the drawings. The exemplary embodiments and the combinations shown in the exemplary embodiments are purely by way of example and are not intended to determine the scope of protection of the disclosure. This is defined only by the appended claims.

BRIEF DESCRIPTION OF THE DRAWINGS

FIG. 1 is a schematic sectional view through a first bearing component according to an exemplary embodiment of the present disclosure.

FIG. 2 is a schematic sectional view through a second bearing component according to an exemplary embodiment of the present disclosure.

FIG. 3 is a schematic sectional view through a third bearing component according to an exemplary embodiment of the present disclosure.

Figure 4:
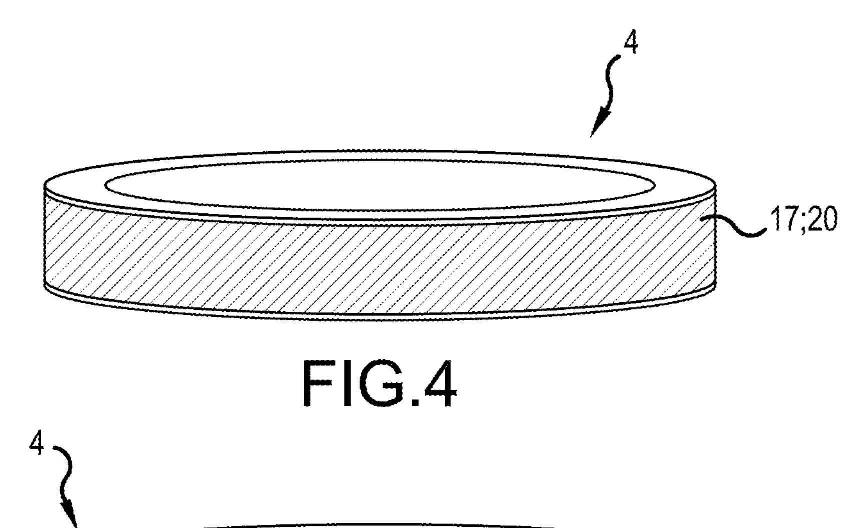

FIG. 4 is a perspective view of a bearing component according to a first exemplary embodiment of the present disclosure.

Figure 5:
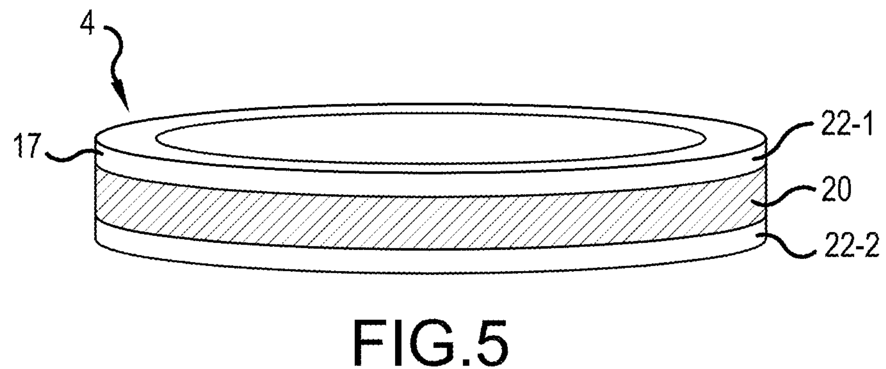

FIG. 5 is a perspective view of a bearing component according to a second exemplary embodiment of the present disclosure.

Figure 6:
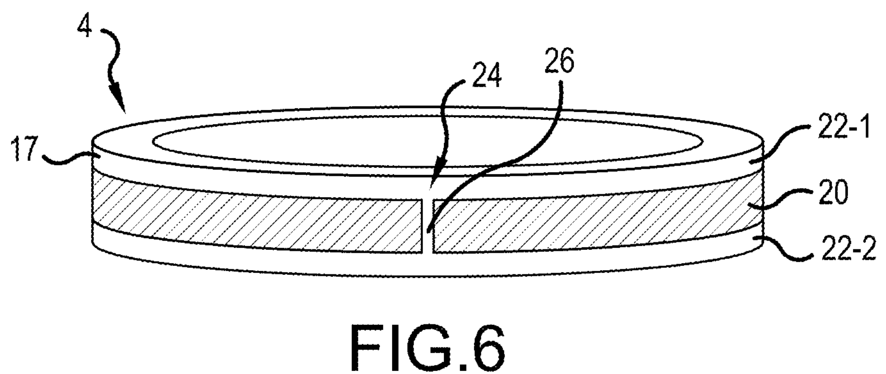

FIG. 6 is a perspective view of a bearing component according to a third exemplary embodiment of the present disclosure.

Figure 7:
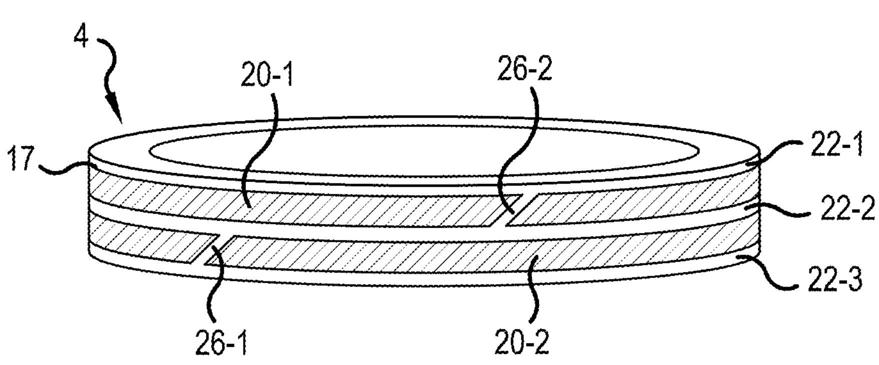

FIG. 7 is a perspective view of a bearing component according to a fourth exemplary embodiment of the present disclosure.

Figure 8:
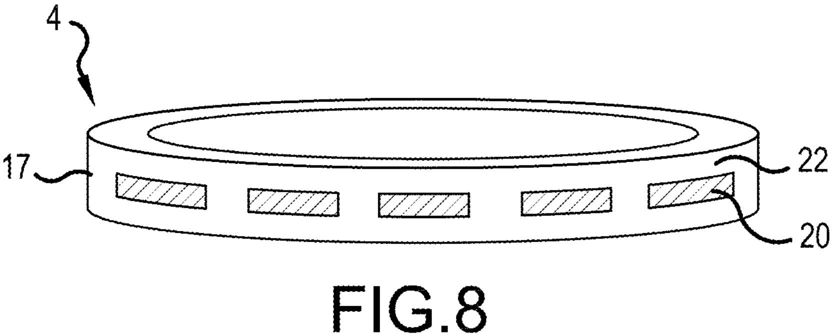

FIG. 8 is a perspective view of a bearing component according to a fifth exemplary embodiment of the present disclosure.

Figure 9:
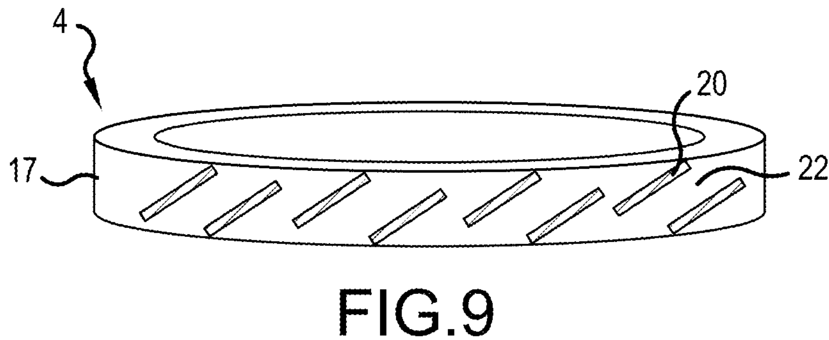

FIG. 9 is a perspective view of a bearing component according to a sixth exemplary embodiment of the present disclosure.

Figure 10:
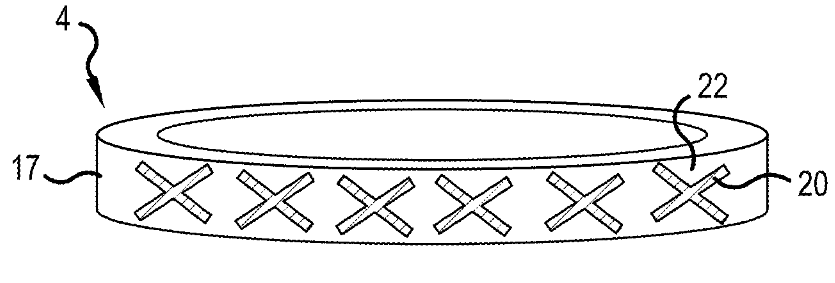

FIG. 10 is a perspective view of a bearing component according to a seventh exemplary embodiment of the present disclosure.

Figure 11:
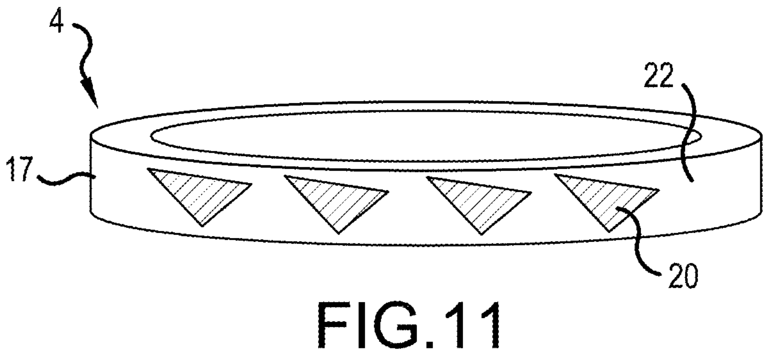

FIG. 11 is a perspective view of a bearing component according to a eighth exemplary embodiment of the present disclosure.

DETAILED DESCRIPTION

In the following text, identical elements or elements with the same function are indicated by the same reference signs.

FIG. 1 schematically shows a sectional view through a bearing ring of a ball bearing, wherein the bearing ring 1 may represent an outer ring 2 or an inner ring 4. Furthermore, FIG. 1 shows that the bearing ring 1 has a raceway 6, which is subjected, during operation, to rolling contact with a rolling element, in this case a ball. Thus, the raceway 6 represents a functional face for the ball bearing because this face performs the function of a rolling surface for rolling elements that is important for operation of the bearing. In order to withstand the loads that arise for example on account of rolling contact with the rolling element, the raceway 6 is usually hardened, in particular induction-hardened. This results in a hardness layer 8, which usually has a hardness penetration depth t that is suitable for accommodating the Hertzian stress that arises from rolling contact with a rolling element at the face.

The secondary faces, or non-functional faces, of the bearing ring are, in the illustrated exemplary embodiment, the shoulder faces 12, 13, the end faces 14, 15, and the inside-diameter face 16 (in the case of a bearing inner ring 2) and outside-diameter face 17 (in the case of a bearing outer ring 4), respectively. These non-functional faces are usually not hardened. The reason for this is that, firstly, during the inductive hardening or during the through-hardening of bearing components, relatively significant warping can be expected, which requires reworking so that the bearing component will have the appropriate dimensions. However, this reworking then has to take place on the specially hardened material, which places higher demands on the corresponding tool than does treatment of the unhardened bearing component. Moreover, hardening is very expensive and energy-intensive and is therefore usually employed only at the locations at which hardening is essential for the functioning of the bearing.

By contrast, the non-functional faces 12, 13, 14, 15, 16 17 are not usually subjected to significant loads during operation of the bearing and so particular hardening is not required here. However, it has been found that, in particular in the case of non-functional faces that are subjected to sliding contact, for example by contact with an element accommodating the bearing component, for example a shaft to which an inner ring is fastened for conjoint rotation or a housing which is connected to the outer ring for conjoint rotation, but also in the case of faces which serve, for example, as seal contact faces or as a cage guide, for example the shoulders 12, 13, increased wear can be found. Thus, in particular during the assembly of a bearing ring 1 in or on the accommodating component (shaft; housing), increased wear or wear marks can be found, which restrict the operation and lifetime of the bearing.

Moreover, so-called ring creep, i.e. a movement of the ring relative to the accommodating component, can arise at the connection, actually for conjoint rotation, between the bearing component and accommodating element, and this should be avoided. In order to avoid this ring creep, the bearing components are usually attached to the accommodating component with a very high interference fit. This requires a relatively large overlap, which results in very high tensile stresses for the bearing and the accommodating component. Therefore, alternatively or additionally, it is known to apply friction coatings or other mechanical fastening elements, for example twist-prevention means, at the outside diameter, on the corresponding faces, for example the inner or outer circumferential faces.

In order to counter these problems, at least one of the secondary faces 12, 13, 14, 15, 16, 17 is laser hardened to reduce wear. The laser-hardening results in a phase transformation, which results in a change in volume of the hardened material such that the hardened locations stand out slightly from the surface. This fact can be used to locally increase the coefficient of friction at the laser-hardened surface regions or to provide the surface with a specific texture, which ensures, for example, that lubricant is retained at specific locations or is guided to specific locations. In this case, in particular at the faces which are in contact with a surrounding component, for example the inside-diameter faces 16 or outside-diameter faces 17 of the bearing ring 1, the friction-area-increasing characteristic of laser-hardening is preferred since a smaller overlap can be chosen as a result, but nevertheless a comparable, if not better rotationally fixed connection between the bearing component and surrounding component can be achieved. This in turn reduces the tensile stresses in the bearing itself and results in a longer lifetime.

By contrast, at the shoulder faces 12 and 13, it may, for example, be particularly preferred to apply a lubricant reservoir structure or lubricant channel structure to guide lubricant in the direction of the rolling elements or ensure that lubricant remains at the locations and is not conveyed away.

FIGS. 2 and 3 each show a further example of a bearing component, wherein FIG. 2 shows a bearing inner ring 2 and bearing outer ring 4 of a tapered roller bearing, while FIG. 3 shows a tapered roller 30 for such a bearing. As is apparent from FIG. 2, in the case of a tapered roller bearing, too, the raceway 6 of the inner ring 2 and the raceway 7 of the outer ring 4 are induction hardened, the hardness penetration depth again being chosen such that a Hertzian stress is accommodated or that the set fatigue strength profile satisfies the stress profile. In the case of a tapered roller bearing, in addition to the raceways, the flanges are also considered to be functional faces, since they are also subjected to high loads during operation of the bearing. Therefore, the flanges 9 and 10 on which a tapered roller runs are usually also inductively hardened.

Furthermore, FIG. 2 shows that the inside-diameter face 16, that is to say the bore, of the bearing inner ring 2, and the bearing outside-diameter face 17 of the bearing outer ring 4, and the end faces 14 and 15 of the respective bearing rings 2, 4 are laser-hardened.

FIG. 3 schematically shows a tapered roller 30, the raceway 36 of which is inductively hardened, while the end faces 34, 35 thereof or a possibly present bore (not illustrated) are laser-hardened.

FIGS. 4-11 schematically show, via the example of a bearing outer ring 4, different laser-hardened outer circumferential faces 17.

Thus, for example, FIG. 4 shows that the entire surface of the bearing ring outer face 17 is laser-hardened in a slip-free manner. By contrast, FIG. 5 shows that not all of the surface 17 but merely a section thereof, in this case a central annular band 20, may be laser-hardened. Thus, in the illustrated exemplary embodiment, the outer circumferential face 17 has an annular region 20 that is laser-hardened and two annular regions 22-1, 22-2, arranged adjacent thereto, that have not been subjected to laser-hardening and thus have the softness of the untreated material. Furthermore, in FIG. 5 the laser-hardened annular surface region 20 extends continuously about the entire bearing ring 4.

In the exemplary embodiment of FIG. 6, by contrast, the laser-hardened surface region 20 does not extend around the entire circumference and so a gap 26 remains in an end region 24. Such a gap 26 may arise for example during the scanning of the bearing ring. Since, however, the laser-hardened face 20 is a secondary face, or a non-functional face, a small unhardened region 26 is not critical even with regard to the wear properties of the bearing ring.

FIG. 7 shows two laser-hardened surface regions 20-1, 20-2, which each have non-laser-hardened regions 22-1, 22-2, 22-3 laterally and centrally. These regions may act for example as lubricant channels in order to retain lubricant in a targeted manner on the non-laser-hardened regions 22. In addition to the more continuously extending exemplary embodiments in FIGS. 4-7, it may likewise be possible to laser-harden only discrete locations, as is illustrated in the exemplary embodiments in FIGS. 8-11. Of course, other patterns are conceivable, and so, for example, specific patterns for the assignment of the bearing ring to a particular manufacturer are also possible.

Overall, as a result of the laser-hardening of the non-functional faces, a bearing component can be provided which exhibits greater resistance to wear. At the same time, as a result of the laser-hardening of the non-functional faces, a surface texture can be applied which reduces a relative movement between the bearing component and a component accommodating the bearing component. In particular, the laser-hardening also makes it possible to harden bores, for example the inner ring bore or a bore in a rolling element, with the result that the bearing component properties are considerably improved. The laser-hardening itself can be carried out with one or more laser heads, and can preferably be integrated into existing machining processes, with the result that additional expensive machining steps are not required.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing components.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

LIST OF REFERENCE SIGNS

1 Bearing ring
2 Outer ring
4 Inner ring
6, 7 Raceway
8 Hardness layer
t Hardness penetration depth
9, 10 Flange faces
12, 13 Shoulder faces
14, 15 Lateral faces
16 Inside-diameter face
17 Outside-diameter face
20 Laser-hardened surface region
22 Non-laser-hardened surface region
24 End region
26 Gap
30 Rolling element
36 Rolling element raceway
34, 35 Rolling element end face

What is claimed is:

1. A bearing component comprising:

a raceway face, and a non-functional face different from the raceway face, wherein at least one first annular portion of the non-functional face is laser-hardened, wherein at least one second annular portion of the non-functional face is not hardened, wherein the at least one first annular portion of the non-functional face is adjacent to the at least one second annular portion of the non-functional face, and wherein the at least one first annular portion of the non-functional face is raised relative to the at least one second annular portion of the non-functional face.

2. The bearing component according to claim 1, wherein the raceway face is a rolling-element bearing raceway.

3. The bearing component according to claim 2, wherein the at least one first annular portion of the non-functional face has a first coefficient of friction and the at least one second annular portion of the non-functional face has a second coefficient of friction less than the first coefficient of friction.

4. The bearing component according to claim 1, wherein the non-functional face is an inside-diameter face of an inner ring, an outside-diameter face of an outer ring, a lateral face of a bearing ring, a shoulder of a bearing ring, a flange of a bearing ring, and/or an end face of a rolling element.

5. A bearing having a bearing component according to claim 1.

6. The bearing component according to claim 1, wherein the at least one second annular portion comprises a first second portion and a second second portion, and wherein the at least one first annular portion is located axially between the first second portion and the second second portion.

7. The bearing component according to claim 6, wherein the at least one first annular portion of the non-functional face includes a gap.

8. The bearing component according to claim 6, wherein the at least one first annular portion of the non-functional face is circumferentially continuous.

9. A bearing component comprising:

a raceway face, and a non-functional face different from the raceway face, wherein at least one first portion of the non-functional face is laser-hardened, wherein at least one second portion of the non-functional face is not hardened, wherein the at least one first portion of the non-functional face has a first coefficient of friction and the at least one second portion of the non-functional face has a second coefficient of friction less than the first coefficient of friction, wherein the at least one first portion of the non-functional face comprises a first first portion and a second first portion and the at least one second portion of the non-functional face is located between the first first portion and the second first portion, and wherein the at least one first portion is raised relative to the at least one second portion to form a channel.

10. The bearing component according to claim 9, wherein the at least one first first portion is continuous.

11. The bearing component according to claim 9, wherein the at least one first first portion has a circumferential gap.

12. A method comprising:

providing a bearing component having a raceway face and a non-functional face different from the raceway face, and laser hardening at least one first annular portion of the non-functional face while leaving at least one second annular portion of the non-functional face unhardened, wherein the at least one first annular portion of the non-functional face is adjacent to the at least one second annular portion of the non-functional face, and wherein the at least one first annular portion of the non-functional face is raised relative to the at least one second annular portion of the non-functional face.

13. The method according to claim 12, including induction hardening the raceway face.

14. The method according to claim 13, wherein the at least one first annular portion of the non-functional face comprises a continuous annular band.

15. The method according to claim 12, wherein the at least one first annular portion of the non-functional face comprises a first first portion and a second first portion and the at least one second annular portion of the non-functional face is located axially between the first first portion and the second first portion.

16. The method according to claim 15, wherein the at least one first annular portion includes a circumferential gap.

17. The method according to claim 12, wherein the at least one second annular portion comprises a first second portion and a second second portion, and wherein the at least one first annular portion is located axially between the first second portion and the second second portion.

18. The bearing component according to claim 17, wherein the at least one first annular portion of the non-functional face includes a gap.

19. The bearing component according to claim 17, wherein the at least one first annular portion of the non-functional face is circumferentially continuous.

* * * * *